United States Patent

Hullinger et al.

[15] 3,640,842
[45] Feb. 8, 1972

[54] PROCESS FOR MAKING PAPER USING STARCH HAVING AN INCREASED GEL STRENGTH

[72] Inventors: Clifford H. Hullinger, Chicago, Ill.; Lawrence Cohen, Hammond, Ind.; Naoyuki Henry Yui, Chicago, Ill.

[73] Assignee: American Maize Products Company

[22] Filed: May 14, 1969

[21] Appl. No.: 824,681

[52] U.S. Cl. .................................. 162/175, 127/33, 127/71, 260/233.3 R
[51] Int. Cl. ........................................................... D21h 3/28
[58] Field of Search ................ 162/175; 260/233.3; 106/210, 106/130; 127/32, 33, 71

[56] References Cited

UNITED STATES PATENTS

| | | | |
|---|---|---|---|
| 1,907,440 | 5/1933 | Pattillo | 162/175 |
| 2,845,367 | 7/1958 | Alt et al. | 127/32 |
| 3,137,592 | 6/1964 | Protzman et al. | 127/71 X |
| 3,475,215 | 10/1969 | Maurer | 127/33 X |
| 1,248,039 | 11/1917 | Tunnell | 106/210 X |
| 3,374,115 | 3/1968 | Frank et al. | 127/33 X |

FOREIGN PATENTS OR APPLICATIONS 145,689   10/1921   Great Britain

*Primary Examiner*—S. Leon Bashore
*Assistant Examiner*—Frederick Frei
*Attorney*—Eyre, Mann and Lucas

[57] ABSTRACT

Starch is prepared especially for use in the manufacture of paper products by cooking the starch in the presence of aluminum salts at a pH of about 4.0 to 7.0. The treatment is of advantage for lowering the gelatinization temperature of the starch and for increasing the gel strength of the resulting paste. When the treated starch is added to paper pulp it increases the retention of additives and it improves the physical characteristics of the paper product.

3 Claims, No Drawings

PROCESS FOR MAKING PAPER USING STARCH HAVING AN INCREASED GEL STRENGTH

In the manufacture of paper and related cellulose products, it is of known advantage to add starch to the pulp preferably at the wet end of the process in order to improve the physical characteristics of the product. Since the starch is not readily retained by the cellulose fiber, many attempts have been made to improve the retention of the starch and its beneficial effect on the physical characteristics of the product by using starch in a modified form.

It has now been discovered that when starch is cooked at an acid pH in the presence of an aluminum salt and especially in the pressure of an alkali metal aluminate the starch granules swell so much more rapidly that the gelatinization temperature is reduced and there is a definite increase in the gel strength of the paste. Retention of the treated starch by cellulose fiber is improved and for some unknown reason the retention of other additives is also improved along with the strength of the paper product.

The nature of the mechanism by which the aluminum salts change the characteristics of the starch is not known and it may be possible that a new complex molecule is formed. But regardless of the exact mechanism that may later be proven, it was quite unexpected to discover that the gel strength of the starch actually increased when it was treated at an acid pH in the presence of the aluminum salt. While starch treated in accordance with the present invention is of particular advantage for use in the manufacture of paper products, it may also be used to advantage in any industrial application where a reduced gelatinization temperature and a higher gel strength is desirable.

Optimum results are achieved in accordance with the present invention when the starch and aluminum salt are cooked at a pH of about 6.0. Beneficial results may be obtained at a pH of about 4.0 to 7.0. Any of the known starches that contain amylopectin such as corn, waxy maize, wheat, potato and tapioca starches may be used in carrying out the present invention. If desired the starch may be a British gum or other starchy material.

The treatment of starch with the aluminum salt in accordance with the present invention must be carried out in the presence of enough water and at a high enough temperature to cause the granules to swell so that at least some of the granules rupture and burst open. In general starch granules will rupture and burst open in the presence of about five or more parts of water at a temperature of at least about 60° C. The term "cooked" and "cooking" as used in this specification and in the claims is intended to mean that starch is heated in the presence of enough water to cause starch granules to swell to the point where at least some of the granules will rupture and burst open.

The amount of aluminum salt used in treating the starch will vary depending upon the contemplated use of the treated starch. Significant improvement in the treated starch is realized with as little as 0.1 percent by weight of the aluminum salt based on the weight of starch and up to about 30.0 or more percent of aluminum salt may be used. An excess over the amount of aluminum salt that is used in treating the starch may be of advantage as a convenient way to add aluminum salt per se along with the treated starch in certain processes. The aluminum salt employed in treating the starch may be added to the starch granules or to pregelatinized starch at any time in any convenient manner as long as the salt is present when the starch is cooked.

Any of the commercially available aluminum salts which ionize in water may be used in carrying out the present invention such as aluminum sulfate, aluminum chloride, the alums and other complex salts that contain aluminum. Starch treated with the alkali metal aluminates in accordance with the present invention is of particular advantage for use as an additive to paper pulp. The paper products that contain these starches are surprisingly strong and for some unexplained reason the paper retains a significantly greater amount of additives such as titanium dioxide which is one of the more expensive additives used in the manufacture of paper that can only be recovered with difficulty from the waste water. The alkali metal aluminates that may be used include the known sodium, potassium, cesium and rubidium aluminates and among these the sodium aluminate is preferred since it is inexpensive and readily available in commercial quantities. Other sodium aluminates that may be used are described in U.S. Pat. No. 2,345,134. In the manufacture of paper as little as 0.2 percent by weight of treated starch based on the weight of cellulose fiber in the aqueous pulp may be added at the wet end of the process but this amount will vary depending upon process considerations and the physical characteristics desired in the product. The treated starch may also be mixed with the dry cellulose fiber. It is most convenient however to use a dilute aqueous suspension of the treated starch containing up to about 5 percent starch solids and add the suspension to the wet paper pulp before the pulp is embodied in a unitary sheet.

Further details and advantages of the present invention are best understood by reference to the following examples which illustrate some of the embodiments of the invention and scope thereof.

EXAMPLE I

In accordance with the present invention, aliquot of ordinary commercial dent corn starch were cooked in a standard Corn Industries Viscometer with the water bath temperature held at 92° C. and the viscosity of the resulting paste was determined.

The gel strength was also determined in conventional manner using the Saare imbedded disc method in which the force required to pull the disc from the starch gel gives the strength recorded in grams per square centimeter of disc area. In this example the samples were prepared by adding from 0 to 1.5 percent by weight of commercial sodium aluminate containing 23.0 percent by weight of moisture to dent cornstarch and then each sample was slurried in distilled water to a concentration of 5.5 percent by weight of solids.

The sodium aluminate used in the samples was purchased under the trade name of Nalco 680 which is a white powder that contained about 46 percent of $Al_2O_3$ about 30 percent of $Na_2O$ in a molecular ratio of $Na_2O/Al_2O_3$ of about 1.15/1.0. About 80 parts of the powder was soluble in about 100 parts of water at 75° F.

As shown in the table below when the normally alkaline pH of the samples was adjusted with hydrochloric acid to an acid pH the gelatinization temperature (Initial Temperature Rise) was reduced and the gel strength of the cooked and pasted product was materially increased.

TABLE I

| Percent Nalco 680 by weight | pH | Initial rise temp., °F. | Max. visc., g.-cm. | 30 min. visc., g.-cm. | Gel strength g.-sq.cm. |
|---|---|---|---|---|---|
| 0.2 | 7.9 | 69 | 348 | 175 | 144 |
| 0.5 | 8.9 | 70 | 476 | 208 | 95 |
| 1.5 | 9.8 | 71 | 552 | 248 | 106 |
| 0 | 6.0 (ADJ) | 84 | 245 | 228 | 83 |
| 0.2 | 6.0 (ADJ) | 68.2 | 441 | 199 | 234 |
| 0.5 | 6.0 (ADJ) | 68.0 | 554 | 284 | 260 |
| 1.5 | 6.0 (ADJ) | 68.5 | 920 | 464 | 323 |
| 0 | 5.0 (ADJ) | 84.8 | 244 | 225 | 76 |
| 0 | 4.5 (ADJ) | 84 | 244 | 222 | 83 |
| 0.2 | 4.5 (ADJ) | 70 | 310 | 135 | 285 |
| 0.5 | 4.5 (ADJ) | 69.8 | 354 | 138 | 238 |
| 1.5 | 4.5 (ADJ) | 71.0 | 352 | 90 | 195 |

As brought out in Table I, optimum results are achieved at a pH of about 6.0 but beneficial results of the present invention are realized when the starch is treated with sodium aluminate at a pH of about 4.0 to about 7.0 as compared to the samples of starch and sodium aluminate cooked at alkaline pH.

EXAMPLE II

An aqueous slurry of commercial corn starch containing 0.82 percent by weight of aluminum sulfate octa decahydrate ($Al_2(SO_4)_3 \cdot 18H_2O$) based on the weight of starch was made up with 5.5 solids by weight. Aliquots were taken and the pH of each sample was adjusted with sodium hydroxide. The samples were then cooked and the viscosity and gel strength determined as described in Example I. The results were as follows:

TABLE II

| pH | Initial rise temp., °F | Max. visc., g.-cm. | 30 min. visc., g.-cm. | Gel strength, g.-sq. cm. |
|---|---|---|---|---|
| 4.0 | 74.6 | 249 | 67 | 214 |
| 4.5 | 70.1 | 328 | 116 | 206 |
| 5.0 | 69.5 | 398 | 152 | 214 |
| 6.0 | 68.7 | 428 | 172 | 245 |
| 7.0 | 67.8 | 397 | 180 | 176 |
| 8.0 | 68.1 | 366 | 172 | 123 |

An aqueous slurry of the same starch cooked in the same manner at the same concentration in the presence of 0.6 percent by weight of aluminum chloride hexahydrate based on the weight of starch with pH adjusted to 6.0 with sodium hydroxide gave an initial temperature rise of 67.2° C. and a maximum viscosity of 446 g./cm.

The pH of the starch slurry may be adjusted in any convenient manner but chelating acids such as phosphoric or citric acid may tend to decrease the effectiveness of the material.

EXAMPLE III

Commercial corn starch containing 0.2 percent sodium aluminate by weight of the starch granules was slurried in water to a concentration of 2.0 percent solids. The pH was adjusted to 6.0 with sulfuric acid and the starch was cooked for 15 minutes at 190° F. The resulting product was added to a conventional paper pulp slurry consisting of bleached kraft that contained 1 percent rosin and 1.5 percent alum and an adjusted pH of 4.5. The amount of starch added to the paper pulp slurry was 1 percent by weight based on the weight of fiber in the pulp. The addition of the treated starch increased the burst strength of the paper product by 29 percent whereas the addition of the same untreated starch only increased the burst strength by 9 percent.

EXAMPLE IV

The additives customarily used in the manufacture of paper products for retention of starch on cellulose fiber may also be used with the treated starch of the present invention. These retention additives include materials such as fatty amines, polyacrylamindes, halohydrinamine polymers and polyethylene imine. A conventional solution of fatty amine sold under the trade name of CAT-5 in an amount of 4.0 percent weight of common cornstarch was added to an aqueous starch slurry containing 5.5 percent by weight of solids. Three aliquots were taken and cooked as in Example I. The first aliquot contained untreated natural starch. Sodium carbonate was added to the second aliquot to adjust the pH to 9.0 and 0.02 percent of sodium aluminate (Nalco 680) was added to the third aliquot and the pH was adjusted to 6.0 with sulfuric acid. After cooking each sample was added to a conventional paper pulp slurry of bleached kraft that contained 1.0 percent rosin and 1.5 percent alum and was at a pH of 4.5. In each case the amount of added starch was 1.0 percent by weight of the fiber in the pulp. The improvement in burst strength of the resulting paper product was determined to be as follows:

| Sample | % Improvement in Bursting Strength of Paper Product |
|---|---|
| 1. Unmodified starch | 12.0 |
| 2. $Na_2CO_3$ adjusted pH 9.0 | 20.1 |
| 3. 0.2% $NaAlO_2$ adjusted pH 6.0 | 30.4 |

EXAMPLE V

In this example the starch retention aid was a polymer of a halohydrin and an amine sold under the trade name of Tylyte 20. An aqueous slurry of commercial cornstarch containing 2.0 percent by weight of starch was prepared by mixing the starch with 0.2 percent by weight of sodium aluminate (Nalco 680) and 4.0 percent by weight of Tylyte 20 based on the weight of starch. The sample was divided into three parts. The pH of Part A was 8.0. The pH of part B was adjusted to 5.0 with aluminum sulfate and the pH of Part C was adjusted to 5.0 with citric acid. Use of the chelating acid decreased the effectiveness of the material as shown below. Each of the three samples were cooked at 190° F. for 15 minutes. Two additional samples D and E of commercial cornstarch ordinarily used in the manufacture of paper were made and cooked in the same manner. Sample D was made with a cationic cornstarch and sample E with a cationic potato starch.

Each of the samples were added to a conventional paper pulp slurry of bleached kraft containing 1.5 percent rosin, 1.0 percent alum and 2.0 percent $TiO_2$. The pulp slurry pH was 4.5 and the amount of added starch was 1.0 percent by weight based on the weight of cellulose fiber. The resulting paper product formed in conventional manner was tested and compared to a paper blank which did not contain any added starch. The test results in the following table were determined by conventional procedures employed in the paper pulp industry. The tests used in determining the values in Table 3 are as follows:

Mullen Burst Strength (also called Burst Factor was calculated from the bursting strength in pounds per square inch ($B$) used in the formula $$70.3 B/r$$

where $r$ is the basis weight in grams per square meter on a moisture-free basis.

Tensile (also called Breaking Length) was calculated from the formula $$30,240 P/r$$

wherein $P$ is tensile breaking load in pounds on a 15 mm. wide strip, and $r$ is the basis weight in grams per square meter on a moisture-free basis.

Porosity (also called air-resistance) wherein the values listed are the times in seconds required to displace 100 ml. of air through an area of 6.45 cm.$^2$ of the paper.

Tear (also called tear factor) was calculated from the formula $$100 e/r$$

wherein $e$ is the force in grams required to tear a single sheet and $r$ is the basis weight in grams per square meter on a moisture-free basis.

Fold (also called MIT folding-endurance) was computed by testing on an MIT folding tester on strips 15 mm. wide without the exhaust according to TAPPI T511 su-69.

Percent $TiO_2$ retained was calculated by determining the ash content according to TAPPI T413ts-66 by ignition at 925±25° C. in an electric muffle furnace. There is no loss of volatiles from $TiO_2$ upon ignition and therefore the percent $TiO_2$ retained is obtained from the formula $$\frac{\text{Ash content of paper}}{2.00 \text{ (ash content of pulp slurry)}} \times 100$$

TABLE III

| | Mullin burst strength | Tensile | Porosity | Tear | Fold | $TiO_2$ retained |
|---|---|---|---|---|---|---|
| Blank | 41.5 | 5,440 | 500 | 48.8 | 1,000 | 6.4 |
| Starch A | 55.0 | 7,210 | 1,350 | 46.1 | 1,210 | 65.3 |
| Starch B | 55.6 | 7,260 | 1,380 | 45.8 | 1,220 | 68.1 |
| Starch C | 54.5 | 7,165 | 1,310 | 46.5 | 1,200 | 61.8 |
| Starch D | 53.6 | 7,020 | 1,225 | 46.7 | 1,170 | 61.3 |
| Starch E | 54.2 | 7,155 | 1,335 | 46.1 | 1,215 | 62.1 |

Retention of titanium dioxide is extremely desirable in the manufacture of paper. As shown in Table III the starch products of the present invention are of material advantage in providing a high level of TiO$_2$ retention and a surprising increase in the strength of the paper product.

It will be understood that it is intended to cover all changes and modifications of the preferred embodiments of the invention, herein chosen for the purpose of illustration, which do not constitute departures from the spirit and scope of the invention.

What is claimed is:

1. In the process of manufacturing paper products from an aqueous suspension having cellulosic fiber therein, the improvement which comprises the step of adding at least 0.2 percent by weight based on the weight of cellulosic fiber of treated starch to the cellulosic fiber at a point in the process before the aqueous pulp is embodied in a unitary sheet, said starch being treated by cooking it at a pH from about 4.0 to 7.0 in the presence of at least 0.1 percent by weight based on the weight of the starch of an aluminum salt which will ionize in water, in order to cause the starch granules to swell to the point where at least some of the granules will rupture and burst and to cause an increase in gel strength of the starch.

2. In the process of manufacturing paper products from an aqueous suspension having cellulosic fiber therein, the improvement which comprises the step of adding at least 0.2 percent by weight based on the weight of cellulosic fiber of treated starch to the cellulosic fiber at a point in the process before the aqueous pulp is embodied in a unitary sheet, said starch being treated by cooking it at an acid adjusted pH from about 4.0 to 7.0 in the presence of at least 0.1 percent by weight based on the weight of the starch of an alkali metal aluminate, in order to cause the starch granules to swell to the point where at least some of the granules will rupture and burst and to cause an increase in gel strength of the starch.

3. In the process of manufacturing paper products from an aqueous suspension having cellulosic fiber therein, the improvement which comprises the step of adding at least 0.2 percent by weight based on the weight of cellulosic fiber of treated starch to the cellulosic fiber at a point in the process before aqueous pulp is embodied in a unitary sheet, said starch being treated by cooking it at a pH from about 4.0 to 7.0 in the presence of at least 0.1 percent by weight based on the weight of the starch of an aluminum salt which will ionize in water, said cooking being conducted at a temperature from about 60° C. to about 92° C. in order to cause the starch granules to swell to the point where at least some of the granules will rupture and burst and to cause an increase in gel strength of the starch.

* * * * *